Patented Apr. 15, 1947

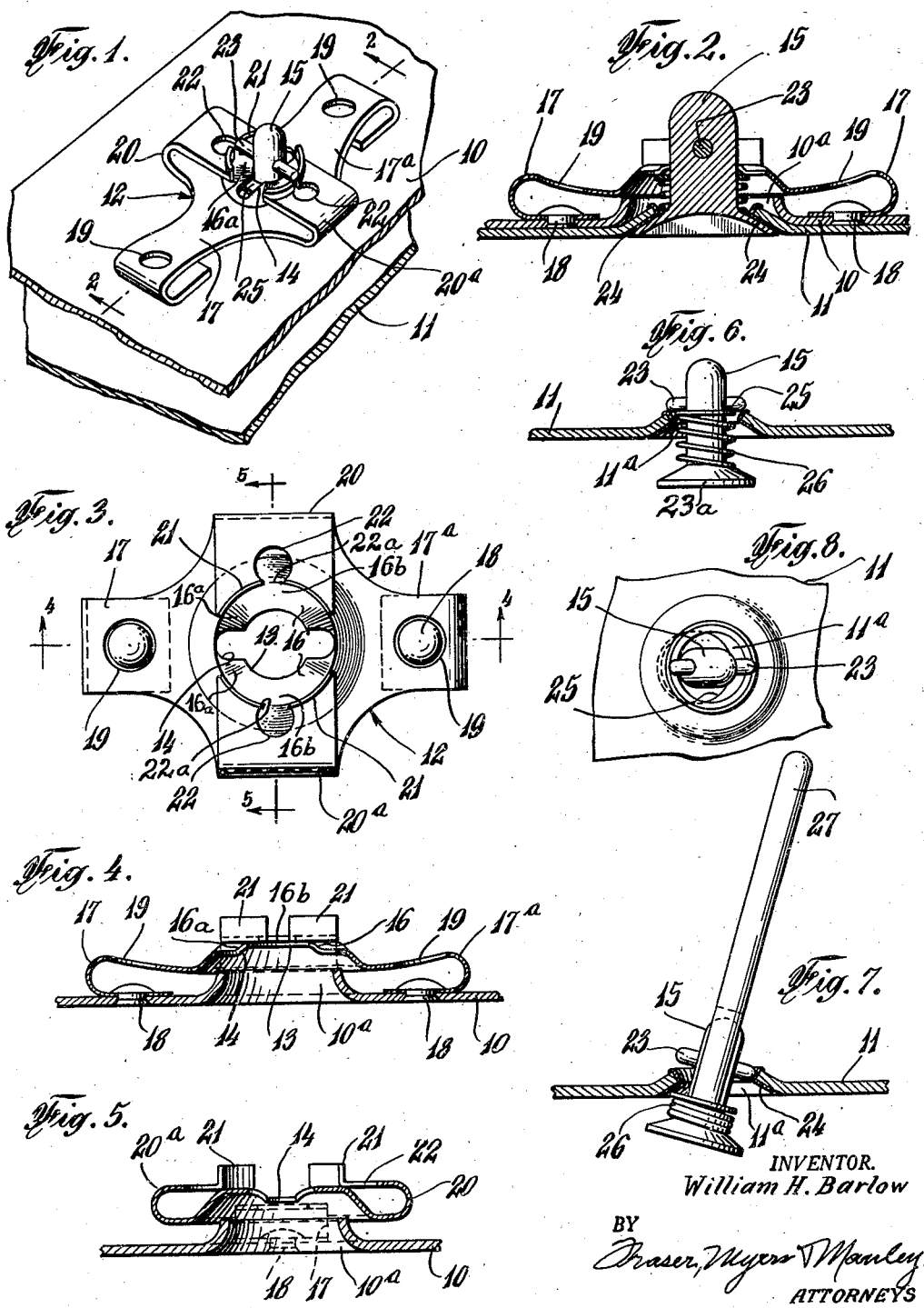

2,419,108

UNITED STATES PATENT OFFICE 2,419,108

COWL FASTENER

William H. Barlow, Waterbury, Conn., assignor to Scovill Manufacturing Company, Waterbury, Conn., a corporation of Connecticut Application December 1, 1942, Serial No. 467,527

6 Claims. (Cl. 24—221)

My present invention relates to fastening devices for releasably clamping and locking together two or more members—more particularly metal plates—in juxtaposed relation. The invention, although susceptible of general application and use, is primarily directed to such fastening devices intended for detachably securing aircraft cowling and inspection plates or covers in place.

One type of fastening device at present conventionally used for the specific purposes above stated consists of a stud having a cross-pin adapted to be passed through an opening in a cooperating locking member formed with cam surfaces over which the cross-pin is caused to ride by turning the stud and with detents or recesses at the high points of the cam into which the cross-pin is drawn and held by a tension coil-spring carried by the stud. The force with which the cross-pin can be held within the detents depends upon the axial tension of the coil-spring and this force is always less than the maximum tension of the spring because of a diminution thereof due to the movement of the cross-pin rearwardly from the high points of the cam into the detents. This loss in spring tension exerted on the cross-pin when in locked position renders the connection susceptible of separation under conditions of great stress and vibration, such as is encountered by the parts of an aeroplane when making a power dive or the like. Moreover, because of dimensional limitations on the fastening devices of this type and other factors, coil-springs having sufficient axial tension to absolutely prevent such disengagement of the cross-pin from the detents, can not be used.

According to my present invention, I provide a fastening device which is especially well suited for the purposes set forth and in which detents or recesses in the cam member which permit of a reduction in the effective axial tension on the cross-pin are eliminated, and in lieu thereof means are provided for insuring that the cross-pin will be held against accidental turning or disengagement while disposed on a predetermined point or on the high points of the cam. This I accomplish by the provision of dual spring means, one for holding the engaged cam and stud members of the fastening device under desired axial tension and one for preventing disengagement of the stud cross-pin from the predetermined high points on the cam. My invention also includes the provision of a novel means for facilitating the assembly of the stud member on the cover plate and holding the stud member in assembled relation thereon so as to facilitate the assembly of such cowling or cover plate in position in a minimum of time and for preventing the removal of such stud member from the cover plate except by the aid of a special tool.

The invention will be better understood from the detailed description which follows when considered in connection with the accompanying drawings showing a preferred embodiment, and wherein:

Figure 1 is a perspective view of the fastening device of my invention in applied relation of holding a cover plate in locked position.

Fig. 2 is a section taken substantially along the plane of the line 2—2 of Fig. 1.

Fig. 3 is a top plan view of the socket element of the fastening device attached to a supporting plate.

Fig. 4 is a section taken substantially along the plane of the line 4—4 of Fig. 3.

Fig. 5 is a section taken substantially along the plane of the line 5—5 of Fig. 3.

Fig. 6 is an elevation of the stud member attached to a cover plate which is shown in section.

Fig. 7 is a view showing the manner in which the stud may be removed from the holding plate.

Fig. 8 is a top plan view of the parts shown in Fig. 7, the tool being omitted.

Referring to the drawings, and more particularly to Figs. 1 to 5 thereof, I have shown an embodiment of the fastening device of my invention as applied to securing together two plates 10 and 11 in juxtaposed relation. The plate 10 may be a part of a body member in the construction of an aeroplane, for example, the nacelle for a motor thereof, and the plate 11 may be a cover plate or cowling for such motor.

The fastening device comprises two cooperating members, namely, a socket member 12 carried by the plate 10 and having a central opening 13 therethrough which is transversed by a diametrical slot 14, and a headed stud member 15 which is insertable through the slotted opening and may be conveniently carried by the plate 11 or used in unconnected relation to said plate.

Preferably the socket member 12 is of cruciform configuration and is made from a cruciform blank of spring metal the central portion thereof which flanks the slotted opening 13—14 being formed with pairs of oppositely inclined surfaces or cams 16 and 16a, the high points 16b of which are located approximately at right angles to the center line of the slot 14. The central portion of the cruciform socket member which is formed as the cam containing plate is resiliently mounted over a flared opening 10a in plate 10 by having the free ends of a pair of aligned arms 17 and 17a of the cruciform blank reversely bent and spaced from tht arms proper and suitably anchored or secured to the plate 10 by rivets or the like 18. To facilitate this riveting operation the portions of the arms 17 and 17a which overlie the points at which the rivets are applied are formed with suitable openings 19. The other pair of aligned arms 20 and 20a of the cruciform blank are also reversely bent in a direction opposite to the arms 17 and 17a so that the free ends of the arms 20 and 20a are disposed in closely overlying relation to the central portion of the blank in flanking relation to the cam surfaces 16 and 16a thereon. The free ends of the arms 20 and 20a are each bifurcated and formed with upstanding flanges or lips 21 arranged in arcuate formation so as to flank the cams 16 and 16a for a purpose which will be presently explained. The free ends of said arms 20 and 20a are intended to constitute spring means adapted to act radially inwardly toward the axis of the opening 13, and to promote this resilient action, the inner ends of the slots 22a which provide the bifurcations are enlarged as shown at 22.

Referring now to Figs. 6, 7 and 8, it will be observed that the stud member 15 adjacent its unheaded end is fitted with a cross-pin 23 of a length to pass through the slot 14 and slightly longer than the normal diametrical distance between the lips or flanges 21 on the arms 20 and 20a adjacent the bifurcations therein. The distance between the cross-pin 23 and the headed stud is such that when the stud is inserted into the socket member and rotated therein, the cross-pin will ride upon the cam surfaces 16 and 16a against the tension of the spring arms 17 and 17a until the cross-pin reaches the crown or high points 16b of the cams. In this position the head of the stud should preferably lie flush with the cover plate 11, and to provide for such flush relationship, the metal of the cover plate surrounding the opening therein is preferably flared inwardly as shown at 11a. Where the cover plate is to be used in aeroplane construction, it will be appreciated that lightness is of primary importance, and hence said cover plates are usually made of aluminum or an aluminum alloy. However, since aluminum and its alloys are relatively soft and subject to considerable wear under conditions of frictional engagement and vibration with other parts, the metal surrounding the flared opening of the cover plate is preferably protected with a steel grommet 24. As herein shown, there is mounted on the stud between the cross-pin 23 and the head 23a, a washer 25 of smaller diameter than the opening in the cover plate, and there is also mounted on said stud a helical tension spring 26 of no larger diameter than the washer. The functions for the washer and spring mounting on the stud will be presently explained.

In clamping and locking the cover plate 11 against the plate 10 the stud 15 is inserted through the socket member 12 so that the cross-pin 23 will pass through the flared opening 10a and the slot 14, whereupon by rotating the stud in a clockwise or counterclockwise direction with the aid of a screwdriver or other suitable tool the cross-pin will be caused to ride upon the cam surfaces 16 and 16a and in doing so will engage the flanges 21 and place the spring arms 20 and 20a under tension. When the cross-pin reaches the high points 16b on the cams, they will snap into the slots 22a provided between the adjacent pairs of ends of the flanges 21 provided by the bifurcations in the ends of the spring arms 20 and 20a and will be locked by said spring arms against accidental disengagement under most severe conditions of stress and vibration. The ends of the cross-pin 23 are preferably rounded so that by applying a sufficient turning force to the studs in either clockwise or counterclockwise direction to overcome the radial tension of the spring arms 20 and 20a the ends of the pin may be disengaged from their holding relationship with the recesses 22a when it is desired to separate or detach the cover 11 from the plate 10.

It is desirable to maintain the stud member in assembled relationship on the cover plate and to normally prevent its removal therefrom, and for this purpose the washer 25 and spring 26 mounted on the stud 15 as hereinbefore described, are employed. The spring 26 surrounding the stud shank will provide an artificial enlarged diameter for said shank and will thereby limit the extent to which the stud can be normally tilted with respect to the opening through the cover plate, which normal tilting will be insufficient to permit the cross-pin to be passed through said opening. However, the stud can be quickly withdrawn from the opening, when desired, by the use of a special tool, such as 27, which is recessed at one end to fit over the free end of the stud and straddle the cross-pin to depress the washer as shown in Fig. 7, thereby operatively restoring the true diameter of the stud above the washer 25, whereupon, by tilting the stud while held in the aforesaid manner by the tool 27 the cross-pin may be passed through the opening to remove the stud. To assemble the stud into its respective opening in the cover plate, the operator with his fingers can easily hold the washer adjacent the head of the stud against the compression of the spring, thereby operatively establishing the true diameter for the stud above the washer, whereupon the stud may be then tilted, so that the cross-pin will pass through the opening, after which the washer may be released and the parts will assume the position shown in Fig. 6 with assurance that under no circumstances can the stud be removed from its plate without the special tool, as above described, or its equivalent. This removable feature of the stud is of particular value where the axial dimension between the outer face of the cover plate and the cam surfaces on the socket member will differ in different installations and parts and it is desirable to obtain a flush connection between the head of the stud and the cover plate. Accordingly, in view of this removable feature it becomes practicable to use in every case a stud of desired length, i. e., one wherein the distance between the head and the cross-pin is such as will provide a flush relationship between the head of the stud and the outer face of the cover plate when such member is clamped in juxtaposition to a part onto which the cover is to be applied.

From the foregoing detailed description it will be apparent that I have provided a novel form of fastening device wherein any degree of axial tension may be obtained between a stud member on the one hand and the camming member on the other, and wherein, regardless of this axial tension, the cross-pin on the stud is held by radial tension against accidental displacement from the desired high point on the cam. It will, of course, be apparent that the present embodiment of my invention is made only by way of example, and changes in the constructional details thereof may be resorted to within the range of engineering skill without departing from the spirit of my invention as defined in the appended claims.

What I claim is:

1. A quickly detachable fastening device for securing a cover plate or the like in position, comprising a socket member having a slotted opening therethrough and formed with two pairs of oppositely inclined cam surfaces, each pair of cam surfaces flanking the slot, said socket member being adapted to receive through said slotted opening a headed stud having a cross-pin adjacent its unheaded end, which cross-pin, when inserted through the slotted opening and rotated therein in either a clockwise or counterclockwise direction, will cause the cross-pin to ride upon the cam surfaces, resilient means operatively associated with the socket member for biasing the central portion thereof in an axial direction to provide engagement between the cross-pin and the cam surfaces as the former is moved over the latter by rotation of the stud, and supplemental resilient means operatively associated with the socket member for engaging the ends of the cross-pin and locking said cross-pin against accidental shifting when it has reached the high points on the cam surfaces in the course of riding up thereon.

2. A quickly detachable fastening device according to claim 1 wherein the supplemental resilient means associated with the socket member are arranged to exert spring tension in a direction toward the axis of the socket member and have recesses for engaging the ends of the cross-pin.

3. A quickly detachable fastening device according to claim 1 wherein the socket member consists of a cruciform element of resilient material, each arm of one of the aligned pair of arms having a bight portion to provide the resilient means for biasing the member in an axial direction and each arm of the other aligned arms having a bight portion to provide the supplemental resilient means for exerting the spring tension in a direction toward the axis of the socket member.

4. A quickly detachable fastening device according to claim 1 wherein the socket member consists of a cruciform element of resilient material, each arm of one of the aligned pair of arms having overlying portions connected by a bight portion to provide the resilient means for biasing the member in an axial direction and each of the other aligned arms having overlying portions connected by a bight portion to provide the supplemental resilient means for exerting spring tension in a direction toward the axis of the socket member, the free ends of said last mentioned arms being bifurcated and shaped to flank the two pairs of cam surfaces.

5. A quickly detachable fastening device for securing a cover plate or the like in position, comprising a single cruciform member affixed to the rear face of the member to which the cover plate is to be attached, the central portion of said cruciform member having a slotted opening therethrough and having cam surfaces flanking said slot on the face of the central portion remote from the rear face of the member, the ends of one aligned pair of arms of the cruciform member underlying the adjacent portions of said arms and being connected thereto by a bight portion to provide a resilient mounting for the central portion and the ends of the other pair of arms of the cruciform member overlying adjacent portions of said arms and being connected thereto by a bight portion with the free end of each of said arms closely overlying the central portion of the member and formed in the shape of an arc to flank the sweep of the ends of the cross-pin on a stud member and to be placed under tension thereby as said cross-pin is moved over the cam surfaces, and the ends of said last-mentioned arms being bifurcated and adapted to engage and latch the ends of the cross-pin when they reach said bifurcations in the ends of said arms.

6. A quickly detachable fastening device according to claim 5 wherein the arcuate ends of the arms of the cruciform member have upstanding flanges for engagement by the ends of the cross-pin of the stud member as it is moved over the cam surfaces.

WILLIAM H. BARLOW.

REFERENCES CITED

The following references are of record in the file of this patent:

UNITED STATES PATENTS

| Number | Name | Date |
| --- | --- | --- |
| 2,309,737 | Murphy | Feb. 2, 1943 |
| 2,309,732 | Johnson | Feb. 2, 1943 |
| 2,281,455 | Powell | Apr. 28, 1942 |
| 2,174,030 | Boyer | Sept. 26, 1939 |
| 1,792,537 | Irwin | Feb. 17, 1931 |
| 1,026,772 | Ries | May 21, 1912 |
| 2,152,231 | Yaneson | Mar. 28, 1939 |
| 1,603,159 | Snyder | Oct. 12, 1926 |
| 2,239,125 | Summers | Apr. 22, 1941 |
| 2,054,519 | Dzus | Sept. 15, 1936 |
| 2,306,928 | Bedford | Dec. 29, 1942 |